Nov. 6, 1962  G. A. MARSH ET AL  3,062,043
STRESS-MEASURING DEVICE
Filed Sept. 16, 1958

INVENTORS
GLENN A. MARSH
BY EDWARD SCHASCHL

United States Patent Office 3,062,043
Patented Nov. 6, 1962

3,062,043
STRESS-MEASURING DEVICE
Glenn A. Marsh and Edward Schaschl, Crystal Lake, Ill., assignors to The Pure Oil Company, Chicago, Ill., a corporation of Ohio
Filed Sept. 16, 1958, Ser. No. 761,356
1 Claim. (Cl. 73—88.5)

This invention relates to apparatus for measuring stress and strain of propeller blades in operation, and is particularly directed to an apparatus for measuring stress and strain on ship propeller blades.

Propeller blades are subjected to cyclic stress and strain which causes fatigue and resultant failure of the metal. Fatigue failure is hastened by the occurrence of vibrational resonance which may occur only at certain frequencies, that is, at certain rates of revolution of the ship's propeller. Resonance may be set up with nodes and antinodes in such a way that little vibration is detectable in some parts of the ship. Thus, while the propeller shaft and bearings on a ship may be vibrating excessively, there may be little or no detectable vibration of the ship's structure.

Figure 1:
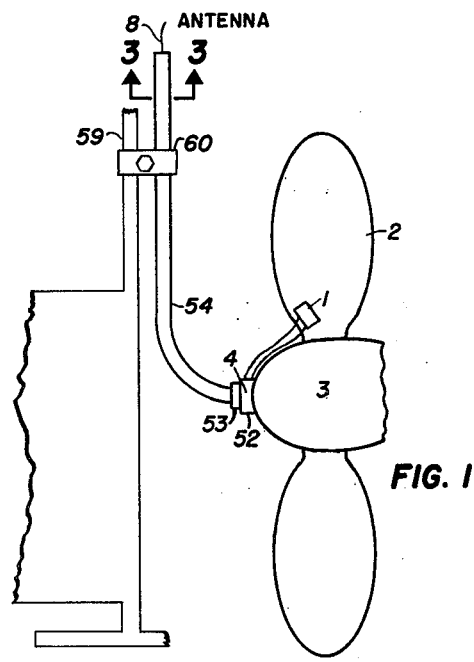
Figure 3:
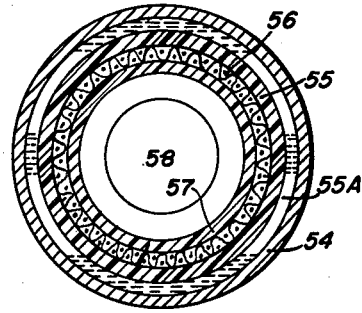
Figure 2:
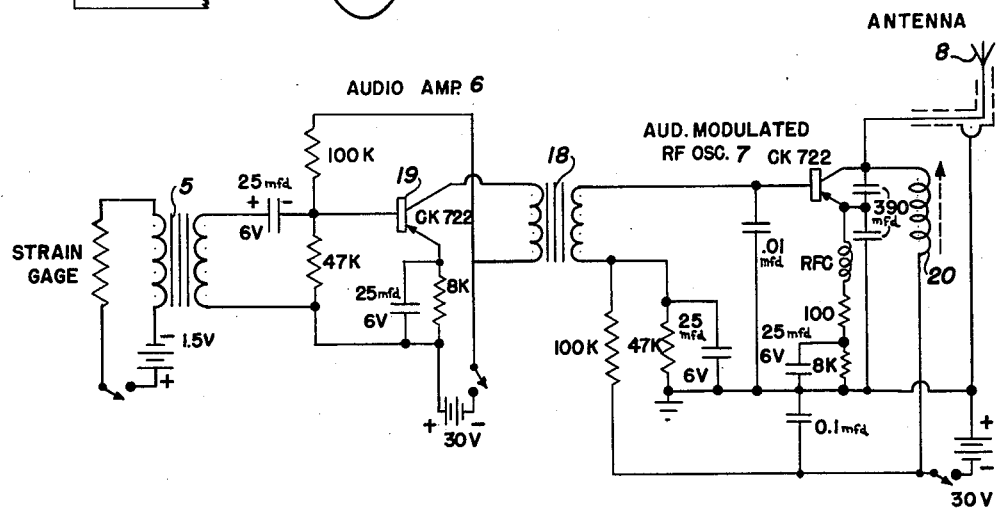
Figure 2:
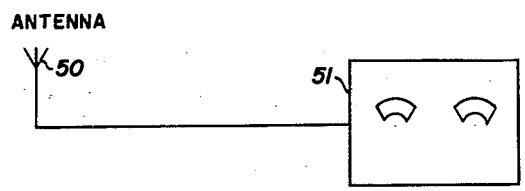

It is an object of our invention to provide a device for measuring stress and strain in propeller blades. It is another object of our invention to provide means for detecting resonance, vibration and/or flexure in propeller blades. It is still another object of our invention to provide method and apparatus which will enable the life of propeller blades to be increased. It is still a further object of our invention to provide a method and apparatus which will enable operation of a propeller under optimum conditions to reduce metal fatigue and failure. Other objects of the invention will become manifest from the following description and accompanying drawing, of which FIGURE 1 is a diagrammatic view showing the manner in which the apparatus of the invention is mounted on a ship's propeller; FIGURE 2 is a wiring diagram forming part of the invention; and FIGURE 3 is a cross-sectional view of the flexible cable along the line 3—3 of FIGURE 2, which cable is an element of the novel apparatus to which this invention is directed.

Referring to the drawings, FIGURE 1, the numeral 1 indicates a conventional strain gauge which is cemented or otherwise firmly fastened to the face of propeller blade 2 at a point adjacent to hub 3. Strain gauge 1 is electrically connected to amplifier 4, which is mounted axially on the propeller hub.

Referring more particularly to FIGURE 2, the amplifier consists of transformer 5, audio-amplifier section 6, audio-modulated RF oscillator section 7 and antenna 8. The audio-amplifier section 6 consists of conventional transistor circuitry. Alternating current input from the strain gauge appears across transformer 5, is amplified by transistor 19 and appears at transformer 18. Radio-frequency oscillator 7 oscillates at a radio frequency determined by a coil 20 having adjustable inductances. The audio signal across transformer 18 modulates the radio frequency generated by oscillator 7. The signal appears at antenna 8.

The amplified alternating signal from the audio-amplifier section 6 is transformed by means of transformer 18, and passes through the audio-modulated RF oscillator section 7, consisting of conventional transistor circuitry. The signal from the RF oscillator section 7 is conducted to antenna 8, and it is picked up by the receiving antenna 50, which is loosely coupled to the antenna 8. The antenna 50 is connected to radio receiver 51, by means of which the signal from the oscillator 7 is made audible to the operator.

The entire circuit for the amplifier and oscillator is preferably transistorized and mounted in a water-proof casing 52 securely fastened to the hub of the propeller centered with the axis of the propeller shaft. The casing 52 is formed with a bearing 53 to which the water-proof sheathing 54 is securely fastened and in which the flexible cable rotates. Sheathing 54 may be made of corrosion-resistant metal or plastic, such as polyethylene or Teflon. The antenna 8 is connected to the oscillator by means of a conventional coaxial cable used in RF transmission lines and consists of a flexible, water-proof, plastic layer 55 (FIGURE 3) with a film of lubricant 55A between the layer 55 and the sheathing 54, grounded wire-mesh layer 56, plastic insulation layer 57, and central conductor 58. The several layers, including the central conductor 58, are adapted to rotate in the sheathing 54, which remains stationary.

The sheathing extends vertically upwardly above the water level and may be fastened to any part of the ship's structure as, for example, rudder support 59, by means of clamp 60. It will be apparent that the coaxial cable rotates with the propeller shaft and does not interfere with the operation of the strain gauge, amplifier and oscillator. No slip-rings are used.

As a propeller blade is subjected to stress and strain, the electrical resistance of the strain gauge changes, producing an alternating current which is amplified and converted into an audible signal. The intensity or loudness of the signal indicates the amplitude of flexure in the propeller blade 2. The frequency of the signal tone indicates the rate of flexure of the blade. If desired, the AF and RF signals can be rectified and amplified and transmitted to a meter which will quantitatively record the flexure amplitude.

It will be seen that in accordance with our invention the stress and strain on propeller blades are converted into audible instead of electrical signals, and that we are able to accomplish this by mounting the amplifier and oscillator at the hub axis of the propeller and directly connecting the oscillator, by means of a rotatable, coaxial cable, to the antenna.

We claim as our invention:

A propeller-blade stress measuring assembly comprising an electrical-resistance strain-gauge mounted on a submerged propeller-blade intermediate the ends thereof, an electrical circuit, means for supplying a direct current to said circuit, said gauge being connected in said circuit in such manner that the eletcrical output of the circuit changes with change in the resistance of said gauge, a water-tight case mounted coaxially with said propeller for rotation therewith, means enclosed within said case responsive to the output of said circuit for producing a modulated radio frequency signal, a stationary water-proof tubular sheath physically connected at one end to said case in water-tight relation therewith for rotation of said case with respect to said sheath, the other end of said sheath extending out of the water, the major portion of a flexible, electrically-conducting cable rotatably mounted within said sheath, one end of said cable electrically connected to said signal producing means, and an antenna electrically connected to the other end of said cable and extending out of the water.

References Cited in the file of this patent

UNITED STATES PATENTS

| | | |
|---|---|---|
| 2,414,862 | Fearon | Jan. 28, 1947 |
| 2,555,355 | Macgeorge | June 5, 1951 |
| 2,592,223 | Williams | Apr. 8, 1952 |
| 2,727,221 | Sprigg | Dec. 13, 1955 |
| 2,828,475 | Mason | Mar. 25, 1958 |